United States Patent [19]

Wagensonner et al.

[11] 4,216,418

[45] Aug. 5, 1980

[54] SPEED REGULATION OF D.C. MOTOR USING COUNTER

[75] Inventors: Eduard Wagensonner, Aschheim; István Cocron, Munich, both of Fed. Rep. of Germany

[73] Assignee: AGFA-Gevaert, A.G., Leverkusen, Fed. Rep. of Germany

[21] Appl. No.: 904,559

[22] Filed: May 10, 1978

[30] Foreign Application Priority Data

May 16, 1977 [DE] Fed. Rep. of Germany ....... 2722041

[51] Int. Cl.³ .............................................. H02P 5/16
[52] U.S. Cl. .................................. 318/318; 318/314; 318/341
[58] Field of Search ........................ 318/318, 324, 341

[56] References Cited

U.S. PATENT DOCUMENTS

| | | | |
|---|---|---|---|
| 3,110,853 | 11/1963 | Jones | 318/314 |
| 3,295,039 | 12/1966 | MacDonald et al. | 318/314 |
| 3,724,720 | 4/1973 | Bullivant | 318/318 |
| 3,843,914 | 10/1974 | Carlson et al. | 318/341 |
| 3,974,428 | 8/1976 | Hafle | 318/314 |
| 4,054,820 | 10/1977 | Foster | 318/341 |

*Primary Examiner*—David Smith, Jr.

*Attorney, Agent, or Firm*—Michael J. Striker

[57] ABSTRACT

A semiconductor switch connected in the motor current path is controlled by a clocked flip-flop having a switch-ON and a switch-OFF state, capable of changing states only in response to a clock pulse. RPM is selected by establishing the initial count on a downwards counter having a carryover output at which a carryover signal appears when zero count is reached. A first higher-frequency pulse train is counted by the counter. A second lower-frequency train of set pulses has a repetition frequency dependent upon motor speed. The leading end of each set pulse starts the counter counting. An unclocked flip-flop responds to the carryover signal by assuming a motor-speed-too-low state. The clocked flip-flop when clocked responds to the state of the unclocked flip-flop. The trailing flank of the set pulse clocks the clocked flip-flop so that the latter can respond to the state of the unclocked flip-flop and slightly thereafter sets the unclocked flip-flop to the motor-speed-too-high state. Thus, at the time when the clocked flip-flop responds to state of the unclocked flip-flop, the latter is in the speed-too-low state only if the carryover signal was produced before the trailing end of the set pulse.

12 Claims, 1 Drawing Figure

U.S. Patent
Aug. 5, 1980
4,216,418
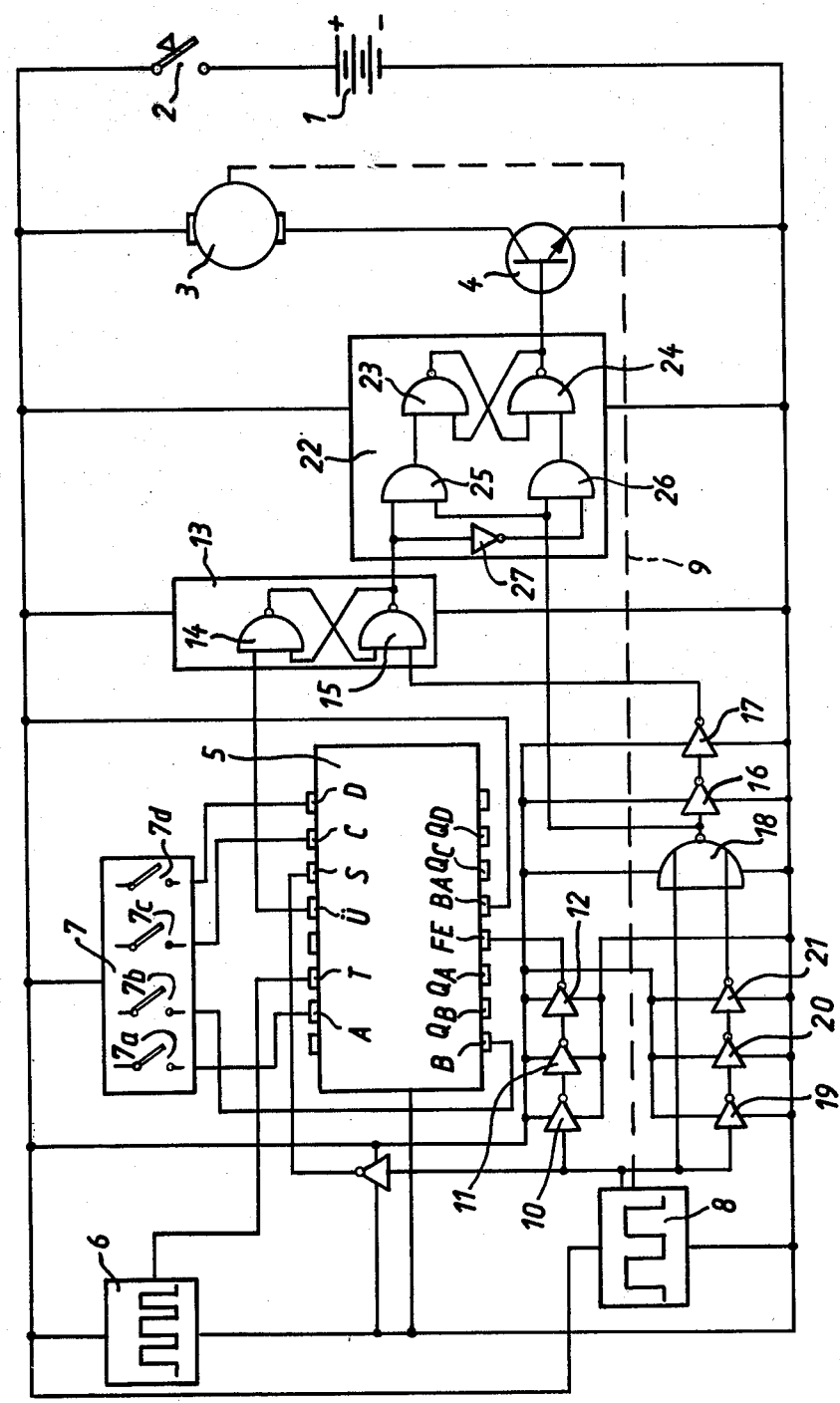

SPEED REGULATION OF D.C. MOTOR USING COUNTER

BACKGROUND OF THE INVENTION

The invention relates to the digital regulation of the RPM of a D.C. motor, the RPM control system and motor being of a type suitable for use in a photographic apparatus. In particular, the invention relates to RPM-control systems in which motor speed is maintained at the selected level by controlling the conductivity of a semiconductor element connected in the motor current path. Of course, a variety of such RPM-control systems are known.

SUMMARY OF THE INVENTION

It is the general object of the invention to provide an RPM-control system of the type in question, but of very simple design, easy to implement using integrated-circuit techniques, of very reliable and unambiguous operativeness and accuracy, and readily implemented in microprocessor form.

These objects can be realized by utilizing a pulse-counting technique. The motor RPM to be established and maintained is selected by selecting the number of pulses to be counted by a counter. A first pulse generator generates a higher-frequency pulse train, whose pulses the counter counts. A second pulse generator generates a lower-frequency train of set pulses whose frequency varies in dependence upon motor RPM. The leading end of each set pulse starts the counter counting pulses. The trailing end of each set pulse causes a clocked storage device to assume one or the other state, energizing the D.C. motor or not, depending upon whether the number of pulses counted by the counter during the course of the set pulse did or did not reach the preselected number. If the preselected number of pulses was counted, the system interprets this as an indication that motor speed is too low. If the preselected number of pulses was not counted, the system interprets this as an indication that motor speed is too high.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts one exemplary embodiment of the invention.

DESCRIPTION OF THE PREFERRED EMBODIMENTS

In the exemplary embodiment shown in the FIGURE, numeral 1 denotes a battery, connectable via a switch 2 to the remainder of the illustrated circuit. Furthermore, closing of switch 2 connects to power a D.C. motor 3 and its power transistor 4.

Numeral 5 denotes a reversible binary counter of conventional type, e.g., as described in the 1976/77 catalog "Digitale Schaltungen" ("Digital Circuits") of the Siemens Corporation, West Germany, pages 205–209, product identification number FLG 215-84191. Counter 5 counts pulses received at its counting input T. It has four inputs A, B, C, D and four associated outputs $Q_A$, $Q_B$, $Q_C$, $Q_D$. Counter 5 has a direction-control input BA, to which is applied the signal which determines whether it is to act as a forwards or as a backwards counter. It has a start/stop input FE, to which a signal is applied to start and removed to stop counting operation. When the counter 5 is to operate in its backwards (downwards) counting mode, the start count from which it counts down towards zero is established by applying to the four inputs A, B, C, D a 4-bit binary number which is to constitute the initial count. In particular, a signal is applied to its set input $\overline{S}$, and when this is done the counter 5 registers the 4-bit number applied to its inputs A, B, C, D as the actual initial count; this 4-bit number then appears at associated outputs $Q_A$, $Q_B$, $Q_C$, $Q_D$, and now constitutes the initial count. Upon subsequent downwards counting towards zero, the binary number on the Q outputs decrease, although in the illustrated embodiment the Q outputs are not actually used. Finally, the counter 5 has a carryover output U. When the counter is operating in the forwards-counting mode and the limit of counting capability is reached, a carryover signal is produced at carryover output U. Likewise, when the counter is operating in its downwards-counting mode and zero count is reached, a carryover signal is produced at carryover output U. Conventionally, the carryover output U is utilized to apply an input signal to the next such counter in a chain of counters, although in the illustrated embodiment the carryover signal is utilized for other purposes. Although a counter having only a 4-bit counting capacity is shown, it will be self-evident that this is exemplary, and that a larger counting capacity can be provided.

The counting input T of binary counter 5 is connected to the output of a pulse generator 6. Inputs A, B, C, D of binary counter 5 are connected to the output of a digital selector unit 7, schematically represented as four switches 7a, 7b, 7c, 7d which can be closed in different combinations to generate different 4-bit numbers. The number selected by means of selector unit 7 determines what motor RPM the illustrated speed-regulating circuit will establish and maintain.

Numeral 8 denotes a set-pulse generator, whose pulse repetition frequency varies in dependence upon the RPM of the D.C. motor 3, being coupled thereto via a coupling 9. The set-pulse generator can be of the simple tachometer type; can be an optoelectronic unit of the type in which an optoelectronic eye senses markings on a synchronizing disk coupled to and rotating with the output shaft of motor 3; can be a motor-speed-proportional pulse generator of the Hall-generator type; can be a mainly mechanical pulse generator in which a mechanical switch is repeatedly closed by a trip or the like coupled to and rotating with the motor output shaft; can be a capacitive-operating pulse generator operative for responding to dielectric variations on a synchronizer disk coupled to the motor output shaft; etc. Persons skilled in the motor-speed control art will appreciate that set-pulse generator 8 can be of any conventional type.

The output of set-pulse generator 8 is connected, via an inverter, to the set input $\overline{S}$ of binary counter 5. When the signal at set input $\overline{S}$ is a "0", the initial-count-determining signals applied to inputs A–D of binary counter 5 are transmitted to the outputs $Q_A$–$Q_D$ of the counter.

Additionally, the output of set-pulse generator 8 is connected to the start-stop input FE of counter 5, through the intermediary of a time-delay stage comprised of a chain of three inverters 10, 11, 12. The counting-direction control terminal BA of binary counter 5 is permanently connected to the positive terminal of voltage source 1, and accordingly in the illustrated circuit counter 5 always operates as a downwards-counting counter.

When the downwards-counting counter 5 has counted down to zero count (or, if it were operating in its upwards-counting mode, has counted up to its maximum count), a carryover signal appears at carryover output U of the counter. Carryover output U of counter 5 is connected to one input of an RS flip-flop 13. Flip-flop 13 is comprised of two cross-coupled NAND-gates 14, 15. The other input of RS flip-flop 13 is connected to the output of a time-delay stage, the latter including two inverters 16, 17.

This time-delay stage 16, 17 is connected in the output circuit of a pulse-transmitting stage, the latter being comprised of a NOR-gate 18. One input of NOR-gate 18 is connected directly to the output of set-pulse generator 8. The other input of NOR-gate 18 is also connected to the output of set-pulse generator 8, but indirectly through the intermediary of a chain of three inverters 19, 20, 21.

The output of NOR-gate 18 is furthermore connected to the clock input of a clocked storage flip-flop 22. Clocked storage flip-flop 22 comprises two cross-coupled NAND-gates 23, 24 forming the internal elementary flip-flop per se, plus two clocking AND-gates 25, 26 and an inverter 27. One input of AND-gate 25 is connected directly to the input of AND-gate 26; i.e., both these inputs of the AND-gates 25, 26 together constitute the clock input of the clocked flip-flop 22 and this clock input is connected to the output of NOR-gate 18. Depending upon whether NOR-gate 18 applies signals to these two AND-gate inputs, these two AND-gates permit or block the transmission of input signals to the internal elementary flip-flop 23, 24 of the clocked flip-flop 22. The other input of AND-gate 25 is connected to the other input of AND-gate 26 through the intermediary of an inverter 27.

The illustrated exemplary speed-regulating circuit operates as follows:

When switch 2 is closed, the voltage of battery 1 becomes connected to the remainder of the illustrated circuit. If now the potential at the output of set-pulse generator 8 jumps to level "1" during a set-pulse time interval, the signals at inputs A–D of counter 5 are registered, transmitted to the output $Q_A$–$Q_D$ (not actually used for anything in the illustrated embodiment), and this establishes the initial count for counter 5. However, due to the time-delay established by transmission through the three inverters 10, 11, 12, the potential at start/stop input FE of counter 5 is still at "1", i.e., until the time-delay interval in question elapses; accordingly, counter 5 cannot yet actually start counting. After the time-delay interval introduced by the chain of inverters 10, 11, 12 has elapsed, the potential at counter input FE jumps to "0", and the counter 5 is now fully in readiness to begin counting input pulses.

Now, as each pulse from pulse generator 6 is received at counting input T of counter 5, the count on counter 5 decreases by one. As indicated before, because counting-direction control terminal BA is permanently connected to the positive terminal of battery 1, the counting is always in the downwards mode. If, during the duration of a set pulse, the counter 5 reaches zero count, a carryover pulse appears on the carryover output U. This carryover pulse is transmitted to the output of RS flip-flop 13 and stays available at the output of flip-flop 13 during the duration of the set pulse. When the trailing flank of the set pulse is reached, there is produced by stage 18, 19, 20, 21 a positive pulse, which transmits the signal at the output of RS flip-flop 13 to the output of clocked storage flip-flop 22 and accordingly, to the base of power transistor 4. This positive potential renders transistor 4 conductive, so that electrical energy can be fed to motor 3. As a result, the RPM of the motor 3 increases.

The pulse produced at the end of the set pulse is transmitted with a time delay to the RS flip-flop 13, resetting the latter. The next-following set pulse causes the operation just described to be repeated, all over again. As the RPM of motor 3 rises, so also does the frequency of set-pulse generator 8. If now the motor RPM reaches a speed in excess of the desired speed, then, during the duration of a set pulse, the counter 5 does not have time enough to reach zero count. As a result, for the duration of the next set pulse or pulses, the transistor 4 remains non-conductive until the motor PRM has dropped back down to the selected value.

To gain an overview of how the circuit shown in the FIGURE operates, the following is to be observed.

Because flip-flop 22 is a clocked unit whose elementary flip-flop 23, 24 is connected to the inputs of flip-flop 22 via AND-gates 25, 26, it follows that the state of flip-flop 22 cannot be changed at all, unless "1" signals are applied to the enablement inputs of AND-gates 25, 26 (i.e., the lower input of AND-gate 25 and the upper input of AND-gate 26). The connected-together enablement inputs of AND-gates 25, 26 jointly constitute the clock input of storage flip-flop 22.

Next to be noted, is that this clock input of storage flip-flop 22 is connected only to the output of NOR-gate 18. Because the state of storage flip-flop 22 is not even susceptible to change, except when a "1" signal is applied to its clock input, it follows that the storage flip-flop 22 is not susceptible to a change of stage, except when a "1" signal is produced at the output of NOR-gate 18. Accordingly, one must consider when NOR-gate 18 will actually produce an output "1" signal.

A NOR-gate produces an output "1" signal only when it receives "0" signals on both its two inputs. Here, this can happen only in response to the trailing flank of a set pulse generated by set-pulse generator 8, and in no other case. Thus, if when the motor is first started, set-pulse generator 8 is producing an output "1" signal (e.g., because its optoelectronically sensed synchronized disk is in a corresponding position and has not yet begun to move), then NOR-gate 18 receives a "1" signal on its upper input and a "0" signal on its lower input, and therefore produces a "0" signal at its output. Alternatively, if, when the motor is first started, set-pulse generator 8 is producing a "0" signal, then NOR-gate 18 receives a "0" signal on its upper input and a "1" signal at its lower input, and therefore again produces a "0" signal on its output.

If, during a motor operation, for example as the motor begins to turn, the output signal of set-pulse generator undergoes a "0" to "1" transition (.e.g, the leading flank of a set pulse), then, instantly, the signal at the upper input of NOR-gate 18 changes from "0" to "1" in corresponding manner; however, the signal at the lower input of NOR-gate 18 initially continues to be "1", due to the three-unit time delay introduced by the three inverters 19, 20, and 21, so that the NOR-gate 18 is still producing an output "0" signal. When this three-unit time delay elapses, the input signals at NOR-gate 18 are a "1" and a "0", and therefore NOR-gate 18 continues to produce an output "0" signal. Thus, for all these cases, NOR-gate 18 is producing an output "0" signal.

However, when the trailing flank of the set pulse is produced, the output signal of set-pulse generator 8 goes from "1" to "0". The signal at the upper input of NOR-gate 18 accordingly instantly undergoes a corresponding change from "1" to "0". The signal at the lower input of NOR-gate 18 will now change from "0" to "1", but does not do so immediately, and must first wait for the elapse of the three-unit time delay introduced by inverters 19, 20, 21. During this three-unit time delay following the trailing flank of the set pulse, and only during this short time delay, both inputs signals to NOR-gate 18 are "0", and thus NOR-gate 18 produces an output "1" signal. Thus, an output "1" signal from NOR-gate 18 is the only signal in the circuit which even permits storage flip-flop 22 to undergo a change of state, and this occurs only during a very short time interval at the trailing flank of each set pulse.

Clocked storage flip-flop 22 has two states: one is a transistor-conductive state keeping transistor 4 conductive, and the other is a transistor-nonconductive state keeping transistor 4 non-conductive. As already explained, clocked storage flip-flop 22 is capable of undergoing a change of state only during the brief time interval at the trailing flank of a set pulse, i.e., when the NOR-gate 18 furnishes a clock pulse to flip-flop 22.

Flip-flop 13 likewise has two states: one is a speed-too-low-state, and the other is a speed-too-high stage. Flip flop 13 can be caused to assume its speed-too-low state (of it is not already in that state) by applying a signal to its upper input; flip-flop 13 can be caused to assume its speed-too-high state by applying a signal to its lower input. It is carryover signal U of counter 5 which can furnish to the upper input of flip-flop 13 a signal causing flip-flop 13 to assume its speed-too-low state. If in fact the motor speed is too low then the preset count is counted off before flip-flop 22 is clocked and thus flip-flop 13 is in its speed-too-low state at the moment that flip-flop 22 is clocked. Then, flip-flop 22, when now clocked, responds to the speed-too-low state of flip-flop 13 by assuming its transistor-conductive state (i.e., if it was not already in that state). When the brief clock pulse at the output of NOR-gate 18 has disappeared, and therefore flip-flop 22 no longer susceptible to changes of state, the selfsame clock pulse appears a little later at the output of inverter 17, a little later due to the two unit time delay introduced by the two inverters 16, 17. This pulse is now applied to the lower input of flip-flop 13, causing the latter to change from its speed-too-low state to its speed-too-high state. It is to be noted that, after each clocking of flip-flop 22, irrespective of whether flip-flop 22 actually changes state as a result, the circuit returns flip-flop 13 to its speed-too-high state, if the latter is not already in its speed-too-high state.

If the motor speed is in fact too high, then during one set pulse, the counter 5 will not have time enough to count off the preset count, and carryover signal output U will not be able to change flip-flop 13 to its speed-too-low state; instead, flip-flop 13 will remain in its speed-too-high state, which it had already, been caused to assume by inverter 17 shortly after the trailing flank of the preceding clock pulse. Thus, now when flip-flop 22 is clocked, it responds to the speed-too-high stage of flip-flop 13 by undergoing a transition to its transistor-nonconductive state, i.e., it if was not already in the transistor-nonconductive state. Right after this clocking of flip-flop 22, inverter 17, as always, attempts to reset flip-flop 13 to its speed-too-high state, but of course flip-flop 13 is already in this state.

Various changes can be made in the illustrated circuit. Instead of downwards counting operation, an equivalent result could be achieved with upwards counting operation. Likewise, in the illustrated embodiment, the signal used to set flip-flop 13 to its speed-too-low state is derived directly from carryover signal output U, which is particularly simple, and no use whatsoever is made of the counter's ongoing-count outputs $Q_A$-$Q_D$; however, it should be clear that these outputs could equivalently be used, i.e., to ascertain when a predetermined number of input pulses (corresponding to the desired RMP) has been counted off. In the illustrated embodiment, the frequency of pulse generator 6 is not only higher than that of set-pulse generator 8 but furthermore constant. Alternatively, it should be clear that set-pulse generator 8 could be the constant-frequency pulse generator, in which case pulse generator 6 could be the motor-speed-dependent pulse generator. Other such modifications of the relationships present in the exemplary embodiment will be clear to those skilled in the art.

It will be understood that each of the elements described above, or two or more together, may also find a useful application in other types of circuits differing from the types described above.

While the invention has been illustrated and described as embodied in the use of a particular type of pulse counter, and flip-flop-type storage devices of particular internal configuration, it is not intended to be limited to the details shown, since various modifications and structural changes may be made without departing in any way from the spirit of the present invention.

Without further analysis, the foregoing will so fully reveal the fist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor-speed control for use with a D.C. motor, comprising semiconductor switch means connected in the current path of the D.C. motor and having a conductive and a non-conductive state; pulse-generating means operative for generating a main pulse train of higher pulse repetition frequency and a set pulse train of lower repetition frequency, and including means for varying the frequency of one of the pulse trains in dependence upon the rotary speed of the motor; pulse-counting means having a counting input connected to the pulse-counting means and operative for selecting a motor speed by selecting a number of pulses which the pulse-counting means is to count; counter-control means connected to the pulse-counting means, the selector means and the pulse-generating means and operative in response to each set pulse of the set pulse train for causing the pulse-counting means to start counting anew pulses of the main pulse train, the number of pulses counted by the pulse counting means during each such counting of pulses reaching or failing to reach the selected number of depending on whether the motor speed is too low or too high; and storage means having only two states and connected to the pulse-counting means and responding to the reaching of the selected number by keeping the semiconductor means in one state and responding to failure to reach the selected number by keeping the semiconductor switch means in the other state.

2. The combination as defined in claim 1, the storage means being a clocked storage means responsive to the reaching and failure to reach the selected number only when in receipt of a clocking signal, the counter-control means comprising counting-starting means operative for starting the counting performed by the pulse-counting means in response to the leading end of each set pulse and applying a clocking signal to the clocked storage means in response to the trailing end of each set pulse.

3. The combination defined in claim 2, the counter-control means including time-delay means having an input connected to receive the set pulse train and having an output connected to the pulse-counting means and operative for introducing a delay between the set pulses of the set pulse train and responsive starting of counting by the pulse-counting means.

4. The combination as defined in claim 3, the time-delay means being an inverter.

5. The combination defined in claim 1, the frequency of the set pulse train being motor-speed-dependent, the pulse-generating means comprising set-pulse-generating means comprising means mechanically coupled to the motor and operative for generating an electrical set pulse train.

6. The combination defined in claim 1, the storage means comprising an unclocked storage unit connected to the pulse-counting means and to the pulse-generating means and responding to each reaching of the selected number of pulses by assuming a motor-speed-too-low state and responding to the trailing flank of each set pulse by assuming a motor-speed-too-high state and a clocked storage unit connected to the unclocked storage unit and when clocked responding to the motor-speed-too-low state by assuming a switch-means-conductive state keeping the semiconductor switch means conductive and when clocked responding to the motor-speed-too-high state by keeping the semiconductor switch means non-conductive, and furthermore including means responding to the trailing end of a set pulse by clocking the clocked storage unit before the unclocked storage unit can respond to the trailing end.

7. The combination defined in claim 1, the pulse-counting means being a binary counter having a carry-over signal output, the unclocked storage unit having one input connected to the carryover signal output and responding to a carryover signal thereon by assuming the motor-speed-too-low state and having another input connected to the pulse-generating means for responding to the trailing flanks of set pulses by assuming the motor-speed-too-high state.

8. The combination as defined in claim 6, the means clocking the clocked storage unit comprising clock-pulse deriving means operative for deriving a clock pulse from the trailing end of a set pulse, the clock-pulse-deriving means comprising a logic gate having two inputs, one input being connected to the output of the pulse-generating means for receipt of the set pulse train, and further including time-delay means connecting the other input of the logic gate to the pulse-generating means for time-delayed receipt of the set pulse train.

9. The combination defined in claim 8, the logic gate being a NOR-gate.

10. The combination defined in claim 6, the clocked storage unit being a clocked flip-flop having a clock input, the means clocking the clocked storage unit comprising clock-pulse-deriving means operative for deriving a clock pulse from the trailing end of a set pulse, furthermore including time-delay means having an input connected to receive the clock pulse and having an output connected to the unclocked storage unit for using the clock pulse to cause the unclocked storage unit to assume the motor-speed-too-high state.

11. The combination defined in claim 10, the clocked flip-flop comprising a two-input RS flip-flop and two input gates, the output of each input gate being connected to a respective one of the RS flip-flop inputs, one input of one input gate and of the other input gate being joined together to form the clock input of the clocked flip-flop, furthermore including an inverter connecting the other input of one input gate to the other input of the other input gate, one of said other inputs being connected to the unclocked storage unit.

12. The combination defined in claim 1, the pulse-counting means comprising a reversible motor.

* * * * *